United States Patent [19]

Garabedian et al.

[11] Patent Number: 4,753,773
[45] Date of Patent: * Jun. 28, 1988

[54] DOUBLE TUBE STEAM GENERATOR

[75] Inventors: George Garabedian, Boston; Robert A. DeLuca, Newton Centre, both of Mass.

[73] Assignee: Stone & Webster Engineering Corporation, Boston, Mass.

[*] Notice: The portion of the term of this patent subsequent to Feb. 24, 2004 has been disclaimed.

[21] Appl. No.: 813,598

[22] Filed: Dec. 26, 1985

Related U.S. Application Data

[63] Continuation-in-part of Ser. No. 732,369, May 9, 1985, Pat. No. 4,644,906.

[51] Int. Cl.4 .................. G21C 15/00; F22B 1/02; F22B 37/24
[52] U.S. Cl. .................. 376/299; 376/402; 376/405; 122/32; 122/34; 122/367 R; 165/172
[58] Field of Search .............. 376/402–405, 376/298–299, 258; 165/70, 40, 132, 172, 134, 158; 122/32, 34, 1 B, 367 R, 367 A, 367 C

[56] References Cited

U.S. PATENT DOCUMENTS

| | | | |
|---|---|---|---|
| 3,545,412 | 12/1970 | Kinyon | 122/34 |
| 3,613,780 | 10/1971 | Bruschetti | 165/134 |
| 3,628,507 | 12/1971 | Saporiti | 122/32 |
| 3,662,718 | 5/1972 | Creek et al. | 122/32 |
| 3,812,825 | 5/1974 | Polcer et al. | 122/34 |
| 3,848,572 | 11/1974 | Giardina | 122/32 |
| 3,888,212 | 6/1975 | Wolowodiuk | 122/32 |
| 3,907,026 | 9/1975 | Mangus | 165/70 |
| 3,924,675 | 12/1975 | Essebaggers | 165/40 |
| 4,216,821 | 8/1980 | Robin | 165/70 |
| 4,337,827 | 7/1982 | Jabsen | 165/172 |
| 4,342,362 | 8/1982 | Belleli | 165/158 |
| 4,446,820 | 5/1984 | Jansing et al. | 122/32 |
| 4,554,889 | 11/1985 | Lilly | 122/32 |
| 4,644,906 | 2/1987 | Garabedian et al. | 122/32 |

FOREIGN PATENT DOCUMENTS 1177533  1/1970  United Kingdom .

OTHER PUBLICATIONS

Krett et al., IAEA-SM-284/85 (Lyons, France, Jul. 22-26, 1985).

Primary Examiner—Stephen C. Bentley
Assistant Examiner—Daniel Wasil
Attorney, Agent, or Firm—Hedman, Gibson, Costigan & Hoare

[57] ABSTRACT

A double tube modular coil steam generator is provided in which a multiplicity of inner tubes conducting water are individually surrounded by outer tubes containing liquid metal as a heat transfer agent. The double tubes form into coils, providing a large surface area while conserving space. Immersion of the double tube coil in hot liquid metal, e.g., from the core of a nuclear reactor, causes efficient transfer of heat across the liquid metal in the outer tube to the water in the inner tube, creating superheated steam, which can be cycled to a turbine and converted to electrical power.

The efficiency, reliability and safety of the multiple double tube design of the steam generator obviates the necessity of many secondary heat removal and emergency components in addition to conserving space and material. The modular design allows ease of operation, fabrication and repair.

35 Claims, 10 Drawing Sheets

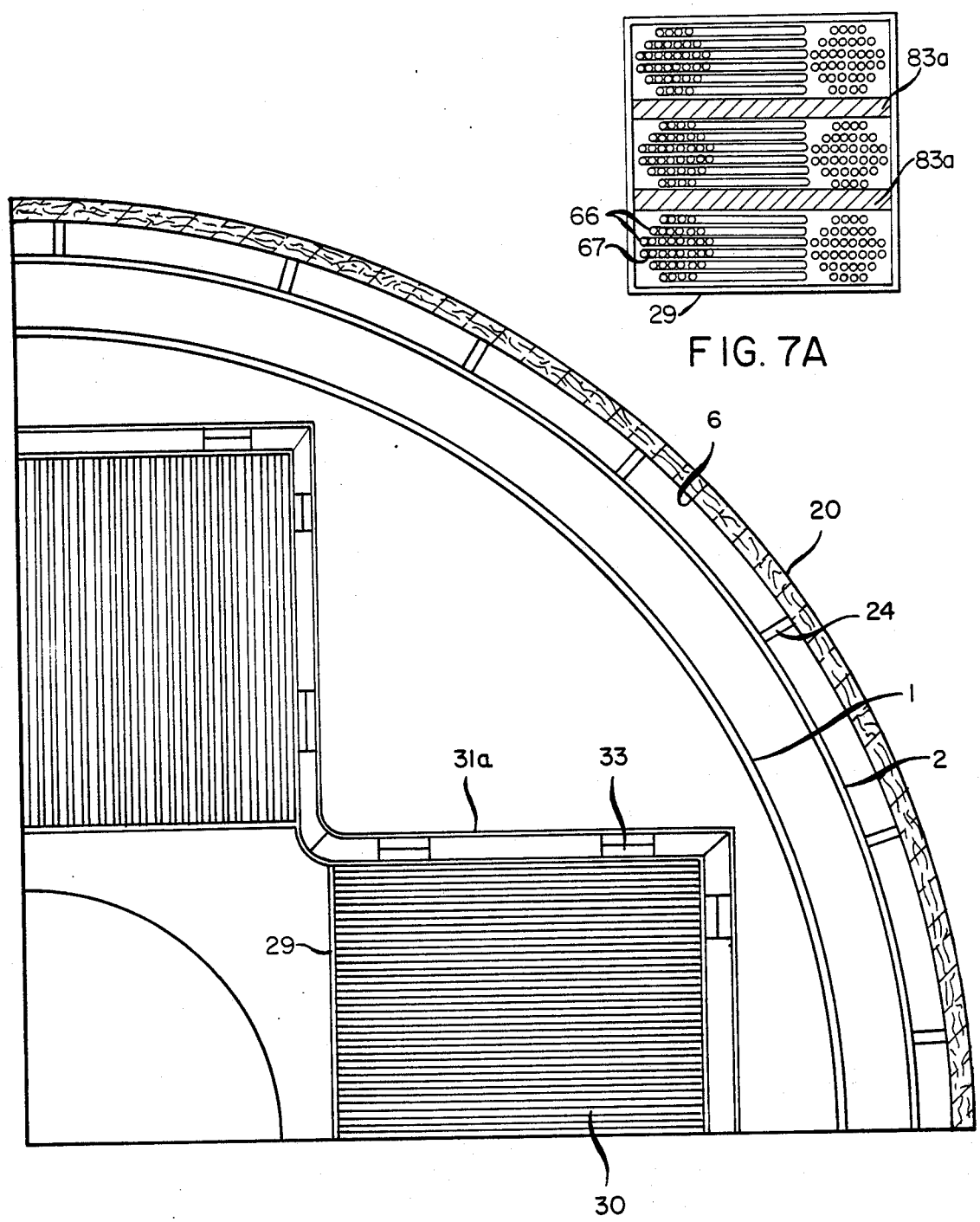

DOUBLE TUBE STEAM GENERATOR

RELATED APPLICATION

This application is a continuation-in-part of commonly assigned, copending U.S. application Ser. No. 732,369, filed May 9, 1985, now U.S. Pat. No. 4,644,906.

FIELD OF THE INVENTION

This invention relates to a steam generator heated by liquid metal, such as may be used in nuclear energy power plants. More particularly, the invention relates to a steam generator for using the heat from a nuclear reactor coolant system to generate high pressure steam and provide improved fail-safe conditions for a reactor coolant system.

BACKGROUND OF THE INVENTION

Nuclear reactors cooled by a liquid metal such as sodium are well known, and the circulating hot liquid metal coolant has been utilized for generating power by heat transfer from the liquid metal to water, which in turn is converted to high pressure steam. The steam is then cycled to a turbine-generator power conversion system for generating electricity.

A major drawback and a safety problem in such steam generators is the need to protect the system against the violent metal-water reactions that may result from a leak in the liquid metal and/or water circulation systems. Should the liquid metal reactor coolant come into direct contact with steam or water leaking out from the steam generator tube, a violent chemical reaction occurs with a corrosive byproduct (e.g., NaOH) and free hydrogen. Conventional reactor-power plant systems employ an intermediate liquid metal heat exchange circuit to protect the reactor core in the event of a leak. Typically, such an intermediate system includes an expansion vessel, complex piping circuits, a heat exchanger, a pump, liquid metal purification equipment, fill and drain systems, electrical preheat systems, and the attendant instruments, controls and structures for housing and support of these components.

From the standpoint of efficiency, design simplicity and conservation of physical space and other resources it would be highly advantageous to eliminate such intermediate systems, however a steam generator design of exceptional reliability or with special protective features such as a double tube wall design would be required.

A drawback of known double tube steam generator systems is their inefficiency in transferring heat from the liquid metal coolant to water. Prior art steam generators of double wall construction have relied on inert gas as a heat transfer medium, however an inert gas barrier is extremely inefficient for this purpose. U.S. Pat. Nos. 3,545,412, 3,613,780 and 3,907,026, for example, show apparatuses wherein closely placed tubes containing liquid metal or water are surrounded by inert gas, or wherein water tubes are run through a sleeve containing inert gas separating the water and liquid metal coolant. Other prior art duplex tube steam generators have used bonded tubes or duplex tubes with mercury as the intermediate heat transfer agent. Bonded tubes can experience difficulties associated with loss of contact stress due to thermal aging. Duplex tubes with mercury pose a safety problem for the reactor core, because typical liquid metal coolants, i.e., sodium, react with the mercury to form an amalgam.

Furthermore, conventional steam generators are large and bulky due to use, typically, of straight tube design. As a result, integration of a steam generating system with the reactor is often complex and costly. Furthermore, such steam generator designs present difficulties in locating a failed tube and in accomodating tube-to-tube and tube-to-shell temperature gradients.

Conventional steam generator systems are also characterized by fabrication and repair drawbacks. Many of the structures are large and custom-manufactured for the particular plant they are used in; and in the event of a structural failure, such as a ruptured water pipe, the entire plant must be shut down in order to isolate the source of the trouble, which can lead to the development of significant temperature transients. Special structures (e.g., gantries or large cranes) may also have to be assembled to repair or replace the damaged components. Finally, conventional steam generator systems often require additional auxiliary systems for decay heat removal.

SUMMARY OF THE INVENTION

Accordingly, it is a primary object of this invention to provide a novel and highly reliable liquid metal steam generator particularly well suited for application in a nuclear power plant.

It is a further object to provide a liquid metal steam generator having improved reliability and safety over prior art designs.

It is a further object of this invention to provide a modular steam generator which has an integral barrier between the hot liquid metal and water systems which does not require a pump, separate piping or an intermediate heat exchanger.

It is a further object of this invention to provide a steam generator with an efficient heat transfer path between the liquid metal coolant and water.

All of the aforementioned disadvantages of the prior art are addressed, and the aforementioned objects attained, by the present invention. The steam generator disclosed herein utilizes stagnant (non-circulating) liquid metal as a heat transfer medium, which is confined to the annulus area of a compact co-axial double tube assembly. Water is conducted through the inner tube, and the double tube assembly is immersed in hot liquid metal coolant. The liquid metal in the annulus area acts as an efficient heat transfer agent between the reactor coolant and the water.

A multiplicity of double tube assemblies are grouped together to form tube bundles, and the tube bundles are fabricated to assume a configuration permitting optimal heat exchange from the hot liquid metal coolant (in which the tube bundles are immersed) and the water carried in the inner tube of each double tube assembly.

The particular configuration of the tube bundles is such that a compact unit is formed, which additionally provides great surface area for heat transfer between the liquid metal coolant and the water, across the stagnant liquid metal barrier in the annular gap. Many such configurations, affording compactness and efficient heat exchange, are possible. For example, single or multiple U-shaped tube bundles, a helical coil or concentric or interlocking multiple helical coils, or, most preferably, a serpentine (sinusoidal) coil.

The large number of double tube assemblies also provides increased safety in operation, because in the event of an inner tube failure, the metal-water reaction is confined to the annulus area of the duplex tube. The liquid metal in the annular gap is the same as or compatible with the liquid metal coolant, therefore an outer tube failure has no hazardous effects.

The steam generator of the present invention may be viewed as the juxtaposition of three closed systems: a circulating water system, a stagnant liquid metal barrier system, and a circulating liquid metal coolant system.

The circulating water system begins at a water inlet that may be connected to an outside feedwater source. From the inlet, the water proceeds via a multiplicity of water-carrying tubes into the body of the steam generator, each of the tubes joins a separate outer tube to form a concentric double tube assembly, and bundles of such double tubes are wound in a particular configuration as mentioned above to form a heat exchanger unit or module. By heat transferred from the outside of the double tube across the annular gap, the water is converted to superheated steam which exits the system at a steam outlet, which may in turn be connected to a turbine generator for the production of electricity.

The stagnant liquid metal barrier system begins at a disengaging chamber, which is completely closed within the steam generator during normal operation of the system. Water-carrying tubes enter the disengaging chamber, where the tubes join with the enclosing outer tubes of the concentric double tube assemblies. The annular gap formed by the joining of inner (water-carrying) and outer tubes is in open communication with the disengaging chamber. The multiplicity of double tubes, as mentioned above, forms a heat exchange unit or module, having a configuration such as a single or multiple U-turns, a helical coil pattern, or a serpentine (sinusoidal) coil pattern. The double tube continues from the heat exchange unit to a closed disengaging chamber where the outer tubes of the double tube assemblies end, and the inner tubes continue on to a steam outlet. The initial disengaging chamber for the outer tube may be the same as or different from the terminal disengaging chamber for the outer tube.

Part of the volume of the annular gap between the inner tube and the outer tube of each double tube assembly is filled with a liquid metal which effectively transfers heat from the outside of the double tube assembly to the inner (water-carrying) tube. The volume of the disengaging chamber(s) and any unfilled volume of the annular gap are preferably filled with an inert gas, such as argon.

The circulating liquid metal coolant system begins at a hot liquid metal coolant inlet which may be connected to the cooling system of a nuclear reactor. Hot liquid metal enters through the hot liquid metal coolant inlet and is directed into contact with the double tube bundles. Heat from the liquid metal coolant is transferred across the barrier liquid metal in the annular gaps of the double tube assembles to the water carried in the inner tubes, creating superheated steam. After transferring heat to the double tube heat exchange unit, cold liquid metal coolant flows away from the unit and is directed out of the steam generator via a cold liquid metal coolant outlet, which may be connected to the core inlet area of a nuclear reactor. Preferably the steam generator assembly described herein is interconnected with a nuclear reactor vessel as detailed in commonly assigned, co-pending U.S. application Ser. No. 582,096, filed Feb. 21, 1984, which is incorporated herein by reference.

The double tube design of the steam generator allows the closest possible contact between the three closed systems while still providing a barrier between the liquid metal coolant and the water. Using liquid metal as a heat transfer agent is much more efficient than inert gas. Using a multiplicity of double tube assemblies increases the heat transfer surface area in direct contact with the hot liquid metal coolant, while dramatically reducing the volume of liquid metal coming into contact with water, in the event of a leak in an inner tube. In addition, using a coil configuration (e.g., helical coil, serpentine coil, etc.) conserves space and inherently accommodates thermal gradients while permitting unobstructed flow of the liquid metal coolant.

Generally, the steam generator comprises a vessel that is subdivided into upper (hot) and lower (cold) liquid metal plenums. In operation, hot liquid metal flows into the steam generator upper plenum, flows through a distributor inlet above the one or more heat exchange units (modules), flows downward over the heat exchange units, transferring heat through the barrier liquid metal (in the double tube annular gaps) to the water flowing within the inner tube of the double tube assemblies. The cooled liquid metal exits into the steam generator lower plenum and is discharged from the steam generator vessel. Optionally, an electromagnetic or centrifugal pump may be connected to the lower plenum, e.g., in the core of the steam generator (see FIG. 1), and a portion of the liquid metal coolant reaching the lower plenum passes into the pump and is discharged at high velocity through a pump eductor back to the reactor. The remaining liquid metal coolant in the lower plenum enters the eductor and passes, mixed with the flow from the electromagnetic pump discharge, through a diffuser to convert the velocity head to a pressure head, and thence to the reactor inlet.

As disclosed in more detail below, the double tube assemblies may be used directly for decay heat removal, eliminating the need for a separate decay heat removal system. In addition, the embodiments of the steam generator described herein premit the use of an external air cooling system as an alternative means of decay heat removal.

BRIEF DESCRIPTION OF THE DRAWINGS

FIG. 7A is a sectional detail of a single square shroud (29) and the structures enclosed therein, showing an alternative configuration of the double tubes and coil sections.

FIG. 9 is a sectional plan view taken across line IX—IX in FIG. 1.

DETAILED DESCRIPTION OF THE PREFERRED EMBODIMENT

The steam generator of the present invention is essentially a heat exchanger having a water/steam circuit enveloped in a stagnant barrier/heat transfer system which may be contacted with hot media for transferring the heat from the media to the water for the production of steam. Although the safety and efficiency of the steam generator of the present invention make it particularly suitable for cooling the hot liquid metal coolant from a nuclear reactor, the invention will be useful in many other applications where efficient exchange of heat between incompatible liquid media is desired. In the following detailed description, the steam generator of the present invention will be described as if it were connected to the circulating liquid metal coolant system of a nuclear reactor. For such an application the customary intermediate heat transfer system components including the intermediate heat exchanger, pump, piping, valves, auxiliary equipment, and associated structures are not required. Elimination of these components and structures results in a compact and low cost nuclear reactor system. A nuclear reactor is chosen as the most preferred embodiment and for ease of explanation, however the following description should not be construed as a limitation of the scope of this invention.

The principal element of the steam generator is a duplex tube heat exchanger module. Several embodiments of the coil configuration are possible, including helical configuration, serpentine (sinusoidal) tube configuration, or a U-tube configuration. FIGS. 1–10 describe a serpentine coil embodiment.

Figure 1:
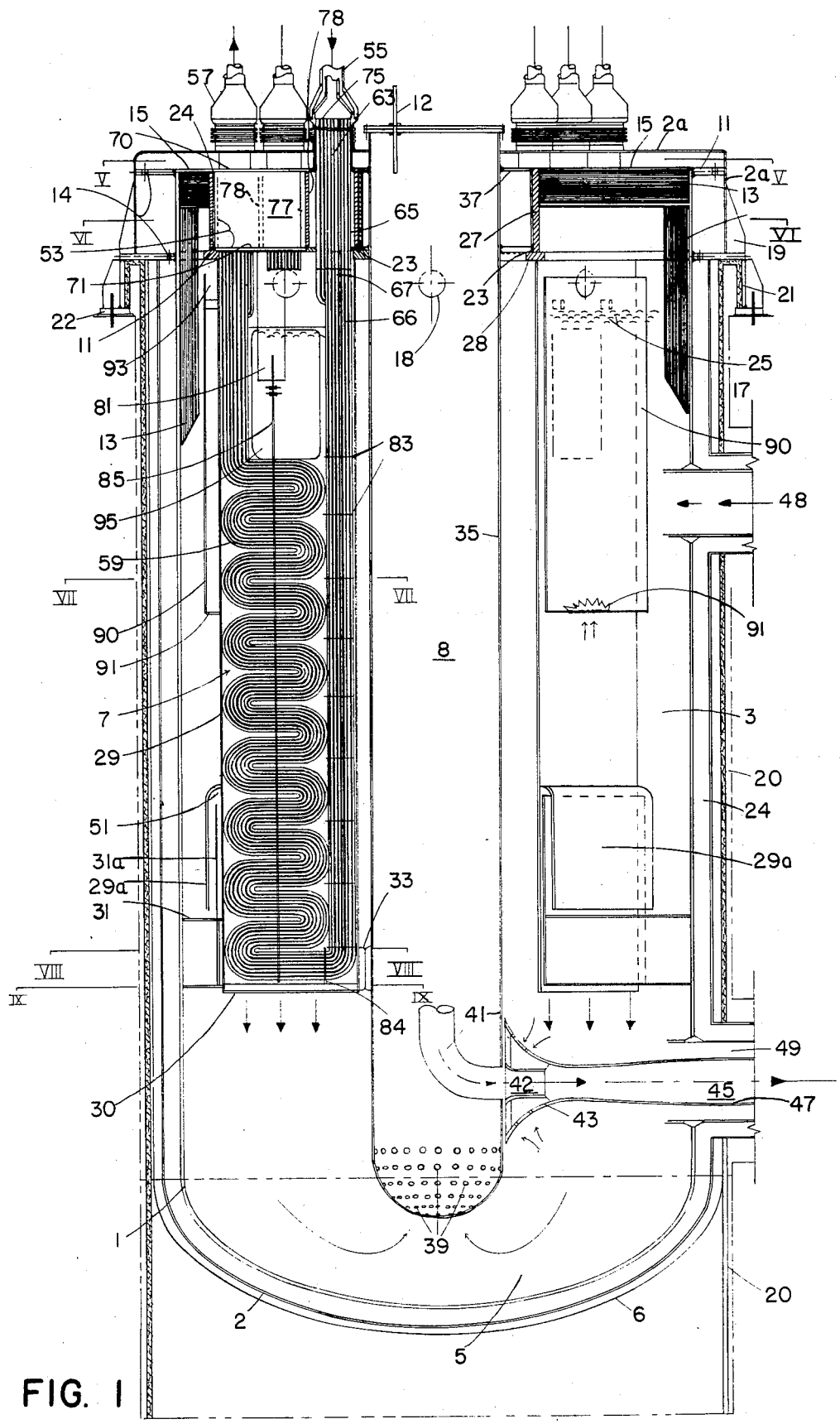
FIG. 1 is a longitudinal cross-sectional elevational view of one embodiment of a steam generator module of the invention.

Referring to FIG. 1, the serpentine steam generator configuration of the invention is comprised essentially of a vertical, cylindrical steam generator vessel (1) closed at its lower end, subdivided into two main chambers, an upper plenum (3) and a lower plenum (5). The upper plenum (3) houses a heat exchange module (7) having double tube assemblies (66) in the configuration of a serpentine coil. As illustrated, the upper plenum (3) of the cylindrical vessel (1) houses four such heat exchange modules (see FIG. 5), however the number and relative position of the modules selected in the practice of this invention may of course be varied according to design requirements, available space, etc. In general operation, hot liquid metal introduced into the upper plenum (3) transfers its heat to water circulating through the serpentine coil double tube assemblies (66), then the cooled liquid metal flows to the lower plenum (5), from which it is ultimately discharged.

At the top of the steam generator vessel there is a grid of support elements (11) on which the heat exchange modules (7) and a core module (8) are mounted. Optional steel sheets (13) at the top and periphery of the steam generator vessel (1) provide insulation when the vessel is filled with hot liquid metal. The top of the cylindrical steam generator vessel (1) is capped by a welded closure plate (15). The steam generator is supported from the surrounding concrete supporting enclosure (17) by a gusseted, torsion-resistant ring girder (19) welded to a cylindrical skirt (21) having bolting flanges (22).

Each heat exchange module (7) is supported by the support grid (11), and at the contact points self-sealing metallic gaskets provide a closure around the module. The dead weight of the module, even when buoyed by the liquid metal coolant filling the steam generator vessel (1) is sufficient to effect a complete seal at the gasket surface. The volume above the coolant level (25) in the upper plenum (3) is filled with an inert cover gas such as argon, and the gaskets (23) prevent leakage of the gas without the need for hold-down bolts. This provides convenience in the removal and replacement of modules. A backup welded omega seal (24) can be provided for additional assurance of leak tightness at the upper contact point of the module at the top of the support grid (11). Alternatively, a boltdown design to secure the modules to the top of the support grid (11) can be provided.

Support grid (11) is comprised of vertical plates (27) welded to horizontal plates (28) at their lower extremity, which horizontal plates (28) also form the seat and sealing surface for the modules (7). The square openings are provided for the heat exchange modules (7) and for a core module (8). (See FIG. 5).

Welded to the horizontal grid plate members (28) are shroud plates (29) which extend vertically downward to below a horizontal diaphragm (31) which separates the vessel (1) into upper (3) and lower (5) plenums. A square shroud (29) is provided for each square opening within the support grid (11) and surrounds a heat exchanger module (7) that is lowered into the steam generator vessel (1). At the lower end of each shroud, bumper blocks (33) are provided for lateral stability against strong vibrational forces, including earthquakes. The bumper blocks (33) are preferably located at the corners of the square shrouds so that any lateral motion is transmitted to the diaphragm (31). The diaphragm (31) is shaped to allow free vertical passage of the shroud (29). The shrouds (29) form (in the illustrated configuration) a continuous sealed cruciform opening allowing insertion of a central core module (8), for housing equipment such as a pump or monitoring/regulating devices (not shown), and four heat exchange modules (7). (See FIG. 5).

The core module (8) of this illustration consists of a cylindrical support housing (35) which has a box-shaped collar (37) providing snug insertion into the center of the support grid (11) and stable seating on the horizontal plates (28). At the height of the horizontal diaphragm (31), the bumper blocks (33) extend from the cylindrical support housing (35) to adjacent shrouds (29). The cylindrical support housing (35) extends beyond the diaphragm (31) and is closed at the lower end. Holes (39) are provided in the lower end of the cylindrical support housing (35) which allow entry into the cylindrical support housing (35). A pump (not shown) may be located within the housing (35), e.g., at an elevation at or above the diaphragm (31), supported from the interior of the cylindrical support housing (35). The pump discharge line (41) exits through the side of the cylindrical support housing (35), below the bottom of the diaphragm (31). Preferably, the discharge line (41) is shaped as a nozzle (42) and an eductor (43), followed by a diffuser assembly (45), may be installed adjacent to the discharge nozzle (42), leading to discharge pipe (47) exiting the steam generator vessel (1) through a lower duct (49). Alternatively, a pipe coupling may be provided which connects the pump discharge line (41) with the discharge pipe (47) that exits the lower plenum (5) through the lower duct (49). The liquid metal coolant entering the upper (3) plenum of the steam generator vessel (1) is separated from the liquid metal coolant in the lower plenum (5) by the horizontal diaphragm (31) and a gas seal (51). The gas seal (51) is continuous around the entire cruciform periphery of the shrouds (29).

Figure 2:
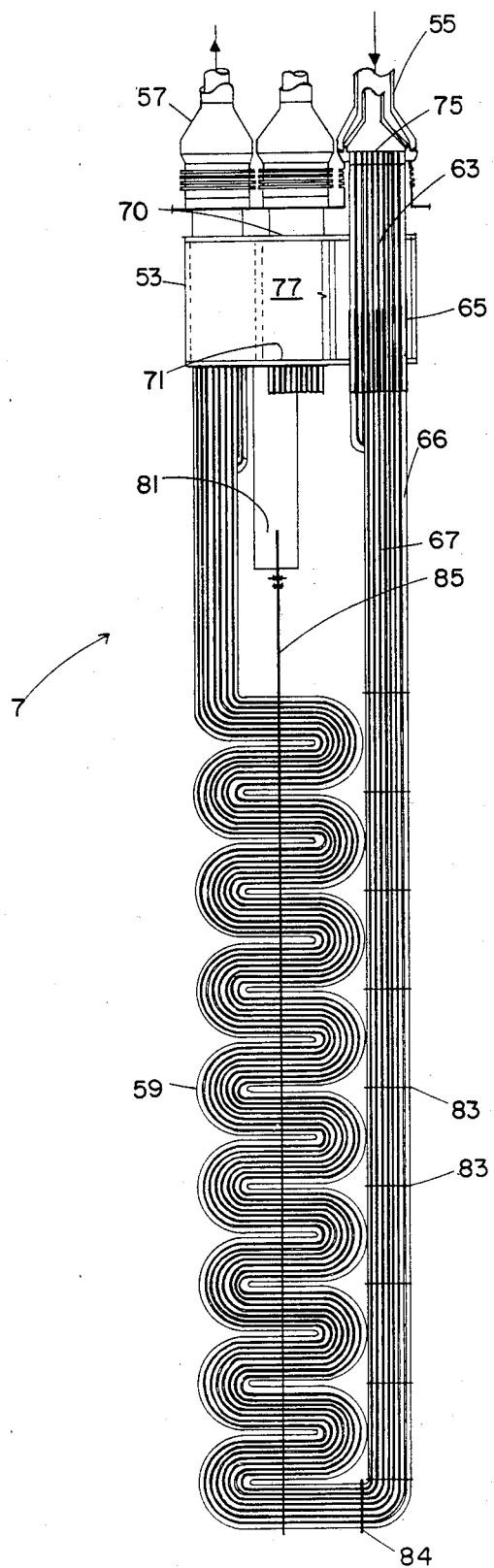
FIG. 2 is an enlarged detail of typical nozzle configurations and disengaging chamber(s) in FIG. 1, showing the mating of the inner and outer tubes to form the double tube assemblies.
Figure 3:
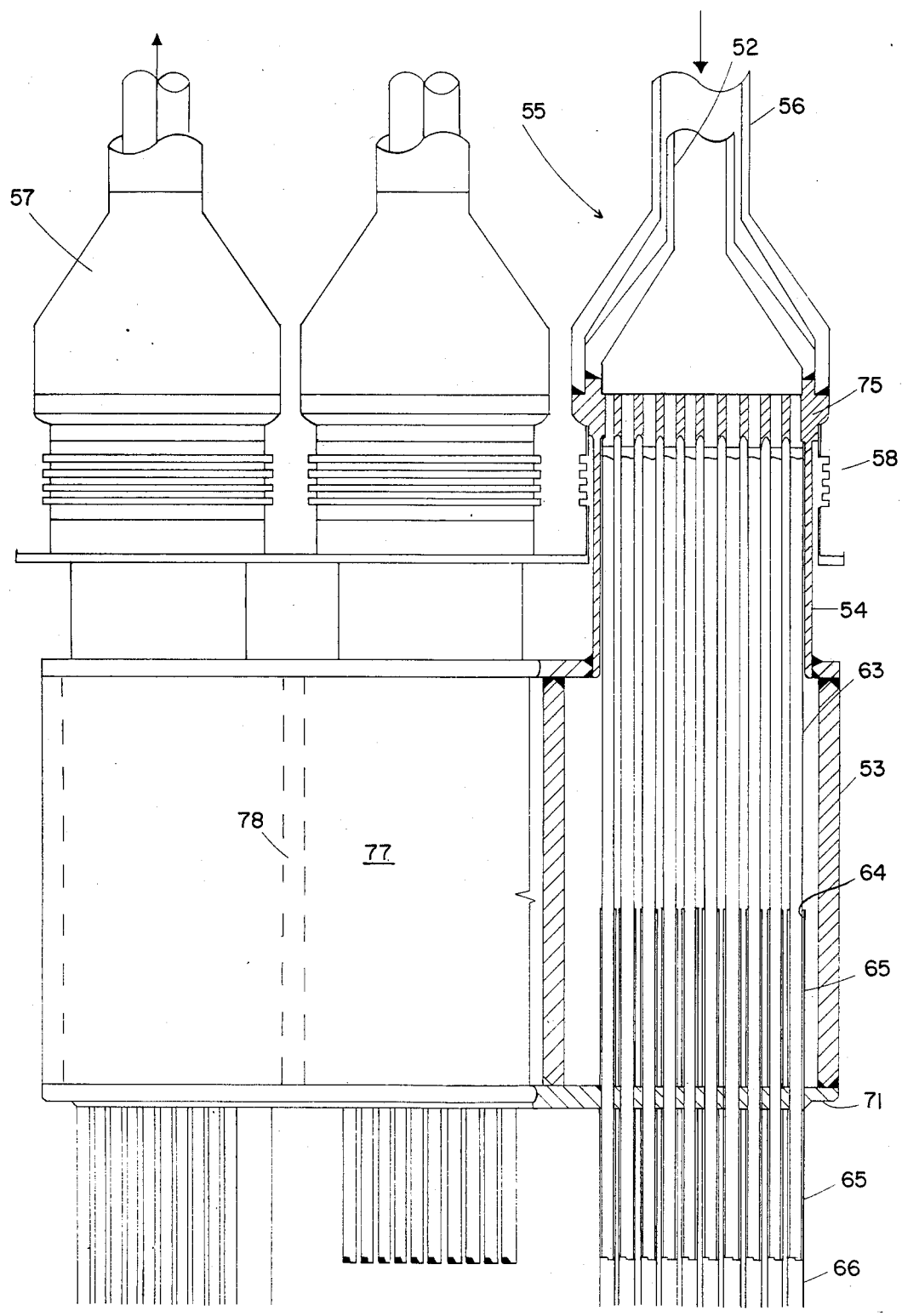
FIG. 3 is an enlarged longitudinal cross-sectional elevational view showing a separate serpentine coil heat exchange module (7) of FIG. 1.

FIG. 2 illustrates a serpentine coil heat exchange module (7). In general, each heat exchange module comprises a box header (53), inlet (55) and outlet (57) nozzles, double tube coils (59) and a coil support bracket (81). Preferably, each module (7) features a large multiplicity (e.g., 10-1000) double tube coils (59), the inner tubes of which extend from inlet nozzles (55) to outlet nozzles (57) and form a serpentine coil in between. Each of the double tube coils (59) is comprised of a multiplicity of double tube assemblies (66), having an inner tube (63) and an outer tube (65), which structures are best seen in FIG. 3.

The outer tubes (65) of the serpentine double tube coil are welded to the lower tube plate (71) of the box header (53). At the top of the box header (53) there is a multiplicity of nozzles for feedwater inlet (55) and steam (57). The inner tubes (63) are welded to tube sheets (75) in the necks of these nozzles. The neck of each of the nozzles (55, 57) leads into the upper plate (70) of the box header (53), and the upper plate (70), side walls and lower tube plate (71) of the box header (53) form a disengaging chamber (77) into which outer tubes (65) open. The disengaging chamber (77) may be further subdivided by partitions (78), forming a separate disengaging chamber for either end of each double tube bundle (67).

Figure 4:
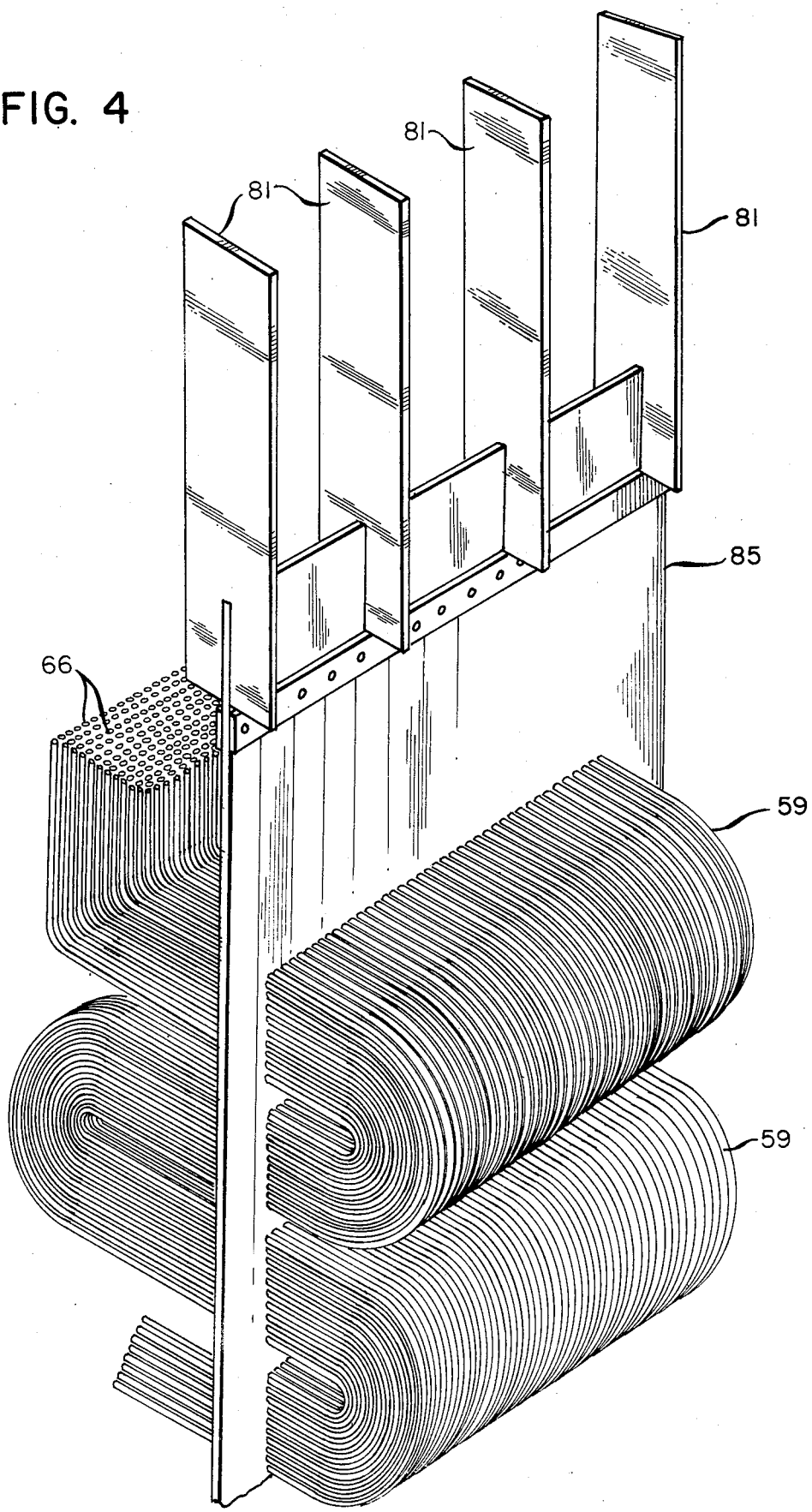
FIG. 4 is an enlarged perspective view of a supporting bracket (81) in FIG. 1, showing support means for a serpentine coil.

The heat exchange module (7) includes a coil support bracket (81) for the tube bundles. FIG. 4 provides a perspective view of the coil support bracket (81). Although the exact number of duplex tubes may of course be varied, the embodiment illustrated herein shows several rows of double tube assemblies (66) gathered together to form a descending tube bundle (67) which has about 304 duplex tubes. The tubes of each tube bundle (67) are secured in the bundle configuration at intervals by spacer plates (83) and a vertical support strip (85), which structures serve to maintain the relative position and spacing of each duplex tube in the bundle (67) and along the length of the serpentine coil (59). Primary support for the coil is provided by the vertical support strips (85), which are fastened at their upper end to the coil support bracket (81), which, in turn, is fastened to the underside of the box header (53) of the heat exchange module (7). The spacer plates (83) also serve as a flow baffle, preventing channeling of the liquid metal coolant in the vertical tube bundle area. Additional support for the duplex tube bundle may be provided with bottom spacer supports (84) which stand on a base structure (30) at the foot of the square shroud (29) (see FIG. 1). The bottom spacer supports may be designed to provide an initial (cold) prestress in the vertical tube bundle. The base structure (30) of the square shroud (29) is preferably a series of parallel bars extending across the bottom of the shroud and located directly beneath each row of duplex tubes. This particular configuration for the base structure (30) lends stiffness to the lower end of the shroud (29) and permits transfer of lateral seismic forces to the diaphragm (31), increasing the overall operational safety of the steam generator.

The circulating water system within each heat exchange module (7) begins at a feedwater inlet nozzle (55). A large diameter feedwater inlet tube (52, FIG. 3), leading from an outside feedwater source, ends at an inner tube sheet (75) at the bottom of the feedwater inlet nozzle (55). A multiplicity of water-carrying inner tubes (63) are connected to the bottom of the inner tube sheet (75). As best seen in FIG. 3, each of the inner tubes (63) is joined with a co-axial outer tube (65) to form a concentric double tube assembly (66). The mating of the inner tube (63) with an outer tube (65) defines an annular gap (64) which in operation of the steam generator will be filled with liquid metal as a heat transfer agent. Spacing between the co-axial tubes (63 and 65) may be provided by a helically wound spacer wire (not shown), brazed to the outer surface of the inner tube (63), which will separate both tubes and provide an unimpeded flow path for the liquid metal within the annular gap (64). As noted above, welded components of the box header (53) create a closed disengaging chamber (77) into which the outer tubes (65) open. In preferred embodiments, the disengaging chamber (77) for each heat exchange module (7) is further subdivided with vertical partitions (78), which separate the disengaging chamber (77) into discrete compartments, with (most preferably) one such compartment for each feedwater inlet nozzle (55) and each steam outlet nozzle (57).

The multiplicity of double tube assemblies (66) of each module (7) are gathered into a tube bundle (67) and extend into the square inner cavity of the upper plenum (3), which inner cavity is formed by the square shroud (29). Preferably, as shown in FIG. 1, the tube bundle (67) will extend from the header box header (53) downward to a point near the end of the shroud (29), then curve upward in a serpentine coil (59). At the end of the serpentine coil, the tube bundles (67) extend upward to meet the lower tube plate (71) at the bottom of the box header (53), where the outer tubes (65) terminate within a disengaging chamber (77), and the inner tubes (63) continue through the disengaging chamber (77) to terminate at the inner tube sheet (75). Steam generated within the inner tubes (63) exits the steam generator through steam outlet nozzle (57), which in turn may be connected to a turbine generator for the production of electricity.

The steam generator vessel (1) is provided with at least one liquid metal coolant inlet duct (48) connected to the circulating coolant system around the nuclear reactor core. As noted above, the diaphragm (31) between the upper plenum (3) and the lower plenum (5), and a gas seal (51) between the diaphragm male portion (31a) and the shroud female portion (29a), prevent liquid metal coolant entering the upper plenum (3) through the inlet duct (48) and passing directly to the lower plenum (5).

Hot liquid metal coolant entering the upper plenum (3) rises to a level (25) outside the inlet shroud (90) which is connected at its bottom by a perforated distributor sheet (91) to the square shroud (29), as best seen in FIG. 1. This inlet shroud (90) provides the only opening (through the distributor sheet (91)) by which liquid metal may flow between the upper plenum (3) and the lower plenum (5).

A vent space (93) is provided at the top of the inlet shroud (90) near the support grid (11) to prevent a gas bubble from forming. The perforations of the distributor sheet (91) are sized to provide uniform flow to each heat exchange module (7). Above the perforated distributor sheet (91), inside the inlet shroud (90) at the elevation of the top of the serpentine coils, a coolant opening (95) is provided in the shroud (29) to allow hot liquid metal coolant to pour evenly over the serpentine coil tube bundles (67). As more easily seen from the plan view sections (FIGS. 5-9), ample space within the cylindrical steam generator vessel (1) around the outside of the square shrouds (29) is provided, so that liquid metal coolant entering the upper plenum (3) via inlet duct (48) will distribute evenly to all of the heat exchange modules (7).

Heat from the liquid metal coolant is exchanged through the outer tubes (65) to the inner tubes (63) through a barrier liquid metal contained within the annular gap (64) of the double tube assemblies (66). Water in the inner tubes (63) is converted to superheated steam. Cooled liquid metal coolant proceeds downward past the serpentine coil tube bundles (67), past the end of the square shroud (29) and into the lower plenum (5).

In preferred features, a guard vessel (2) is present which, with the closure plate (2a), completely surrounds the steam generator vessel (1) and serves as a containment vessel. Its primary function is to contain any liquid metal coolant or radioactive gas that might leak through the wall of the steam generator vessel (1) or any of its connected structures (i.e., closure plate (15), support grid (11), liquid metal inlet duct (48), liquid metal outlet duct (49)). The free volumes above the liquid metal coolant level (25) within the upper plenum (3) and within the heat exchange and core modules (7, 8) may be interconnected with vent holes (18). The space including the volume enclosed by the guard vessel (2) is filled with an inert cover gas such as argon to prevent oxygen contamination of the liquid metal coolant. The volume between the steam generator vessel (1) and the guard vessel (2) is in communication with the volume under the guard vessel closure plate (2a) by means of bleed holes (14).

The feedwater inlet nozzle (55) are preferably combined to a common manifold (not shown). There are preferably four inlet (55) and four outlet nozzles (57) per module. Partition plates may be inserted within the disengaging chamber (77) between the feedwater inlet nozzles and steam outlet nozzles and welded around all edges to make each of the feedwater inlet and steam outlet nozzles completely discrete from the other nozzles. Alternatively, vent and drain holes may be provided in the partition plates between the steam nozzles and between the feedwater nozzles, to form two disengaging chambers, separating the four steam outlet nozzles from the four feedwater inlet nozzles.

Although in FIG. 1 only one tube bundle (67) and one row of serpentine coils are detailed it will be understood that multiple rows of double tubes and typically four inlet and four outlet nozzles will be present for the heat exchange module shown. (See FIG. 4). In the preferred arrangement four heat exchange modules (representing a total of about 1,216 double tube serpentine coils) are installed in the steam generator vessel.

Referring to FIG. 2, each heat exchange module (7) includes a multiplicity of co-axial double tube assemblies (66). A large number, for example 76 inner tubes (63) will emanate from each feedwater inlet nozzle (55), extend across the disengaging chamber (77) and form co-axial double tube assemblies (66) by mating with outer tubes (65) adjacent a lower tube plate (71). For a module with four feedwater inlet nozzles a total of 304 double tube assemblies are formed. As mentioned above, the double tubes are gathered into a tube bundle (67) which continue, most preferably, to the bottom of the square shroud (29, FIG. 1) where the 304-tube bundle (67) has formed 38 rows of double tubes, with 8 tubes to a row, which all turn upward to from serpentine coils. It is most preferred that all 38 double tube rows be identically wound (in the coil region) to form individual sets of identical serpentine coils having sixteen turns each. Such a design facilitates fabrication and reduces costs, since extensive automation is possible when each coil assembly of each module is identical. The simple square shape of each module in this embodiment also serves to facilitate fabrication, and the compact size of the module makes transportation and installation of the modules easier.

Referring to FIG. 3, each of the feedwater inlets (55) consists of an inlet nozzle tube (52) welded to inner tube sheet (75) to which 10-200, preferably about 76, water-carrying inner tubes (63) are connected. The tube sheet (75) is attached to the box header (53) by a connecting tube (54) which opens into disengaging chamber (77). A concentric guard pipe (56) is welded to the inner tube sheet (75).

Most preferably, a pipe, e.g., a schedule 120 pipe, is welded to the inlet nozzle tube (52) near its upper extremity, and another pipe, e.g., a schedule 120 pipe, is welded to the outer guard pipe (56). These pipes are also concentric. The purpose of this concentric construction is to contain released fluid from the inner nozzle tube (52), or the inner pipe, in the event of a leak. The penetration through the guard vessel is sealed with a bellows connection (58).

Each of the steam outlet nozzles (57) are constructed in an identical manner to the feedwater inlet nozzle (55) described above. Most preferably, there are four feedwater and four steam discharge nozzles for each heat exchange module.

Each inner tube (63) is attached to the inner tube sheet (75). Each outer tube (65), ending in a disengaging chamber (77), is mated with an inner tube (63), forming double tube assemblies (66) which pass through the lower tube plate (71). The double tube assemblies (66) continue into one of the square inner cavities created by the shrouds (29) in the upper plenum (3) and eventually forms a serpentine coil. The concentric arrangement of the inner tube (63) with the outer tube (65) defines an annular gap (64) which will be filled for at least part of the length of double tube assembly (66) with a liquid metal. The stagnant liquid metal in annular gap (64) may be the same as or different from the liquid metal coolant which circulates through the upper and lower plenums (3, 5) of the steam generator vessel (1). A sodium-potassium alloy, NaK, or sodium are the preferred liquid metals. Other liquid metals and fluids may be utilized, as long as they are compatible with the liquid metal coolant introduced into the steam generator vessel (1). As used herein, "compatible" signifies that the liquid metal in the annular gap efficiently transfers heat between the liquid metal coolant and the water in the inner tubes (63) and which, in the event of a leak in an outer tube (65), will not react violently with the liquid metal coolant and will not form byproducts which could be harmful to the nuclear reactor core. Preferably, the heat transfer liquid metal in the annular gap and the liquid metal coolant are the same. Most preferably the liquid metal coolant will be sodium and the heat transfer liquid metal will be sodium, or a sodium-potassium mixture. Use of such a liquid metal in the annular gap will serve to prevent the occurance of "hot spots" in the inner tubes (63).

Although the precise dimensions of the aforementioned tubing are not critical, it is preferred to use a large number of double tube assemblies (66), each having a relatively small diameter. By way of illustration, an inlet nozzle tube (52) can be 10-inch schedule pipe expanding to 22 7/16-inch internal diameter inner at the tube sheet. The guard pipe (56) can be 14-inch schedule 100 pipe expanding to 26⅝-inch internal diameter at the tubesheet (75). The inner tube sheet (77), has 76 inner tubes (63) having a 1.25 inch outside diameter. The inner tubes (63), 1.25 inch outside diameter by 0.17 inch thickness, join outer tubes (65) having inside diameter 1.50 inch and outside diameter 1.75 inch. In the annular gap (64), the inner tube may be preferably provided with a 0.125 inch diameter rod, helically wound at a 1.25 inch pitch, brazed to its outer surface to form a spacer across the annular gap (64). The spacer design within the annular gap (64) permits free expansion of the liquid metal. A range of tube sizes is possible, encompassing an outside diameter of 0.5 inch to over 2.0 inches for the inner tube and 0.6 inch to over 2.5 inches for the inside diameter of the outer tube.

The annular liquid metal functions as a barrier between the water flowing through the inner tubes (63) and the liquid metal coolant flowing over the outer tubes (65). A detection system monitors the level of liquid metal in the annular gap to detect any breach of the integrity of an outer tube. In addition, a detection system, such as a hydrogen monitor, monitors the inert gas space in the disengaging chamber (77) above the stagnant liquid metal to detect any leakage of water/steam into the annular gap (64) or into the disengaging chamber (77).

Referring again to FIG. 1, the core module (8) may house a discharge pump (not shown), which is supported within the cylindrical support housing (35). The support housing (35) terminates inside the lower plenum (5) with a rounded end having numerous perforations (39) through which liquid metal coolant entering the lower plenum (5) may pass. A discharge pump inducts cooled liquid metal coolant from the lower plenum (5) through the perforations (39). The liquid metal is inducted through the intake of the pump and discharged under pressure through discharge line (41) and nozzle (42), then to a jet eductor (43) followed by an outlet diffuser assembly (45), directing cooled liquid metal coolant back to the nuclear reactor. The circulating pump may be of a mechanical centrifugal type or a electromagnetic type of pump. For an electromagnetic type, electrical leads (12) would be provided at the top plate of the core module (8). For a mechanical pump, the pump may be supported at the support grid (11) at the top of the vessel (1). In this case a cylindrical support housing (35) would not be required.

FIG. 4 shows an enlarged perspective detail of the coil support bracket (81) of FIG. 1. The coil support bracket (81) will be attached at its upper end to the box header (53 in FIG. 1). The vertical support strips (85) are attached to the lower end and are supported by the coil support bracket (81). The double tube serpentine coil (59), comprised of individual double tube assemblies (66), is supported by the vertical support strips (85), with each double tube assembly (66) passing back and forth through individual circular openings formed by the vertical support strips (85). Sectional views of the double tube assemblies (66) in FIG. 4 and FIGS. 6-8 omit representation of the inner tube of the duplex tube for clarity, and it will be understood that concentric double tubes (best seen in FIG. 3) are intended by references to the double tube assemblies (66) in these Figures.

FIGS. 5 through 9 provide cross-sectional views of the modular steam generator illustrated in FIG. 1 and show the cruciform construction of this embodiment of the steam generator. The drawings show that the steam generator vessel is completely surrounded by the surrounding enclosure (17). A partial representation of an insulation shroud (20) and fins (24), which may be used for decay heat removal and are more fully discussed below, are supported on the outside of the guard vessel (2). The guard vessel (2) encloses the steam generator vessel (1). Immediately inside the steam generator vessel (1) is the upper plenum (3).

Figure 5:
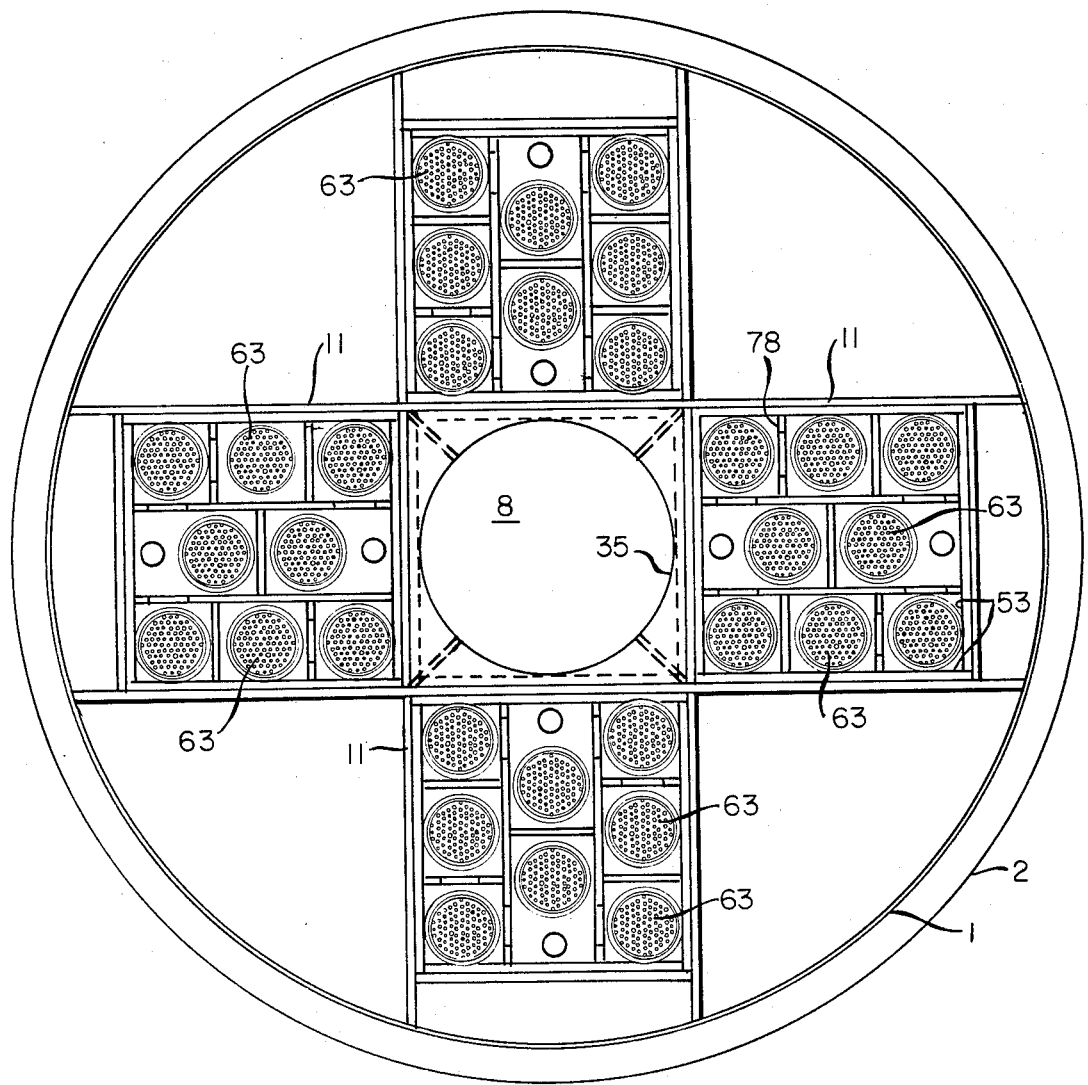
FIG. 5 is a sectional plan view of the steam generator taken across line V—V in FIG. 1.

FIG. 5 shows a cross-section of the entire steam generator emplacement, taken at line V—V in FIG. 1, just outside the welded closure plate (2a). This Figure shows the cruciform arrangement of the support grid (11), forming five square cavities which are occupied by the four heat exchange modules (7) and a central core module (8). For each heat exchange module (7) the Figure shows a multiplicity of inner tubes (63) encircled by the necks of four inlet nozzles (55) and four outlet nozzles (57). The necks of the nozzles (55, 57) end at the upper plate (70) of the box header (53), which is seated securely in the support grid (11).

Figure 6:
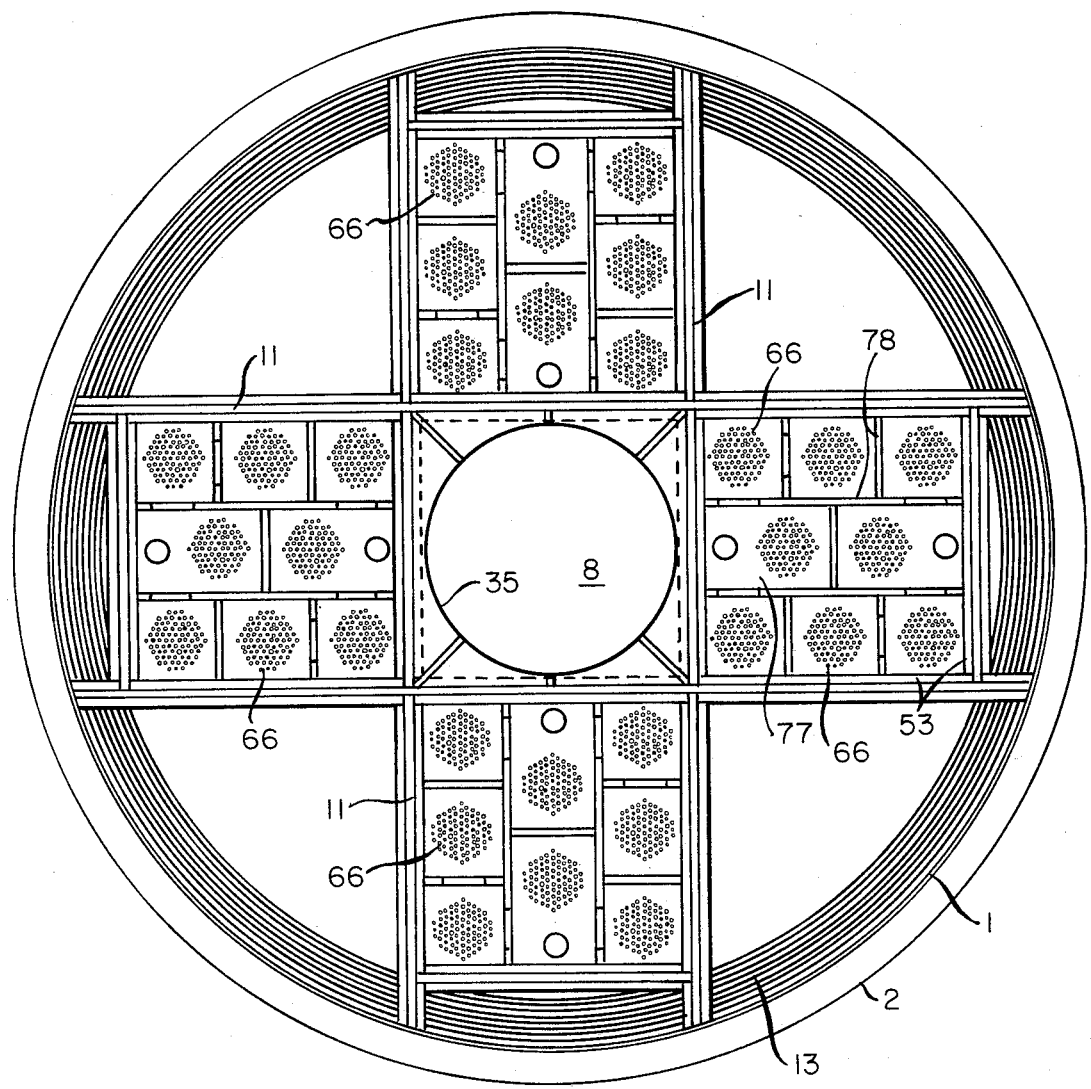
FIG. 6 is a sectional plan view taken across line VI—VI in FIG. 1.

FIG. 6 shows an enlarged section of the steam generator taken at line VI—VI in FIG. 1. Bundles of double tubes (66) are shown enclosed within the box header (53), which is subdivided with partitions (78) into eight separate disengaging chambers (77).

Figure 7:
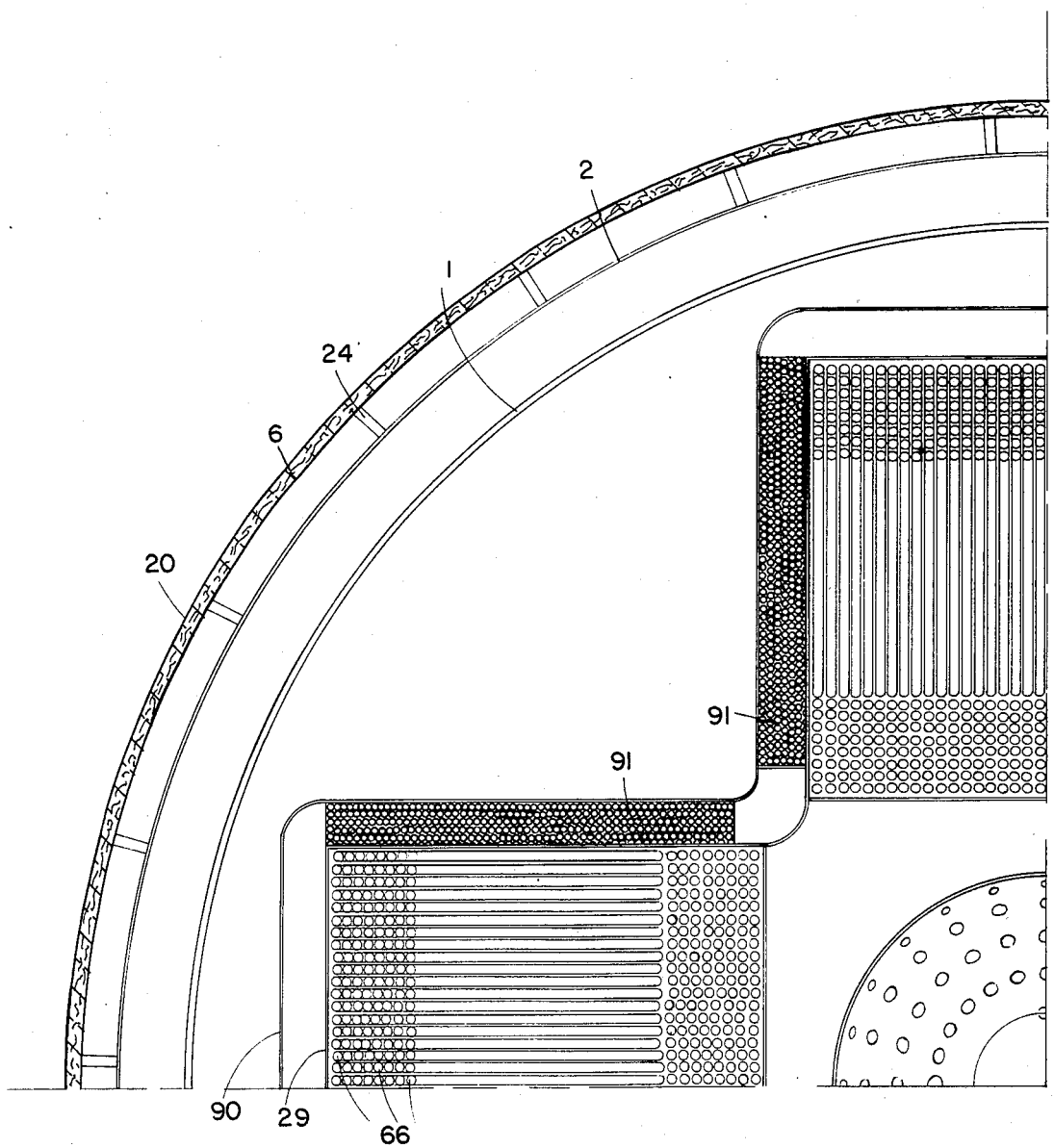
FIG. 7 - is a sectional plan view taken across line VII—VII in FIG. 1.

FIG. 7 shows an enlarged quarter section of the steam generator taken at line VII—VII in FIG. 1. The approximately 304 double tube assemblies (66) associated with the four inlet nozzles (FIG. 5) are shown aligned in thirty-eight rows along the inside of the square shroud (29). Double tubes in the serpentine coil portion (59) are shown in a section taken mid-way through an outside half curve in the serpentine coil, accordingly straight tubing sections are shown extending across the width of the cavity bounded by the square shroud (29) and, along the outside of the cavity, cross-sections of upwardly curving double tubes are seen. Representation of the vertical supporting strip (85 in FIG. 1) is omitted from this Figure.

The flow distributor sheet (91) around the outside of the square shroud (29) provides uniform flow around the periphery of the square shrouds (29) to all of the heat exchange modules. Cross-hatching is used to represent the perforations of the flow distributor sheet (91) in order to avoid confusion with the representation of double tube assemblies (66). The perforations of the flow distributor sheet (91) are sized to provide uniform distribution of the liquid metal coolant to all sides of all of the heat exchange modules in the steam generator vessel.

It will be understood that the number of nozzles, the number of double tube assemblies, the configuration or alingment of the tube rows, and other physical features may be varied in accordance with engineering constraints or the needs of the practitioner. An example of one such variation in the configuration of the tubes is illustrated by FIG. 7A. This feature shows a square shroud (29) into which descend three tube bundles (67) corresponding to three inlet nozzles, instead of four inlet nozzles illustrated in the other drawings. The bundled configuration of the tubes, in the same pattern as the tube sheet of the inlet nozzle where the inner tubes originated, is retained along the entire length of the shroud (29) and throughout the upward coil to the oulet nozzles. By retaining the bundled pattern, the fabrication of custom-made, curved segments to align all of the descending double tube assemblies into a closely packed, rectangular area as seen in FIG. 7 is avoided. Instead, the tubes descend in straight sections from the nozzles. The gaps between the tube bundles necessitates the inclusion of additional baffles (83a), to ensure contact of the liquid metal coolant with the coils and to avoid channeling of the liquid metal coolant flow.

Figure 8:
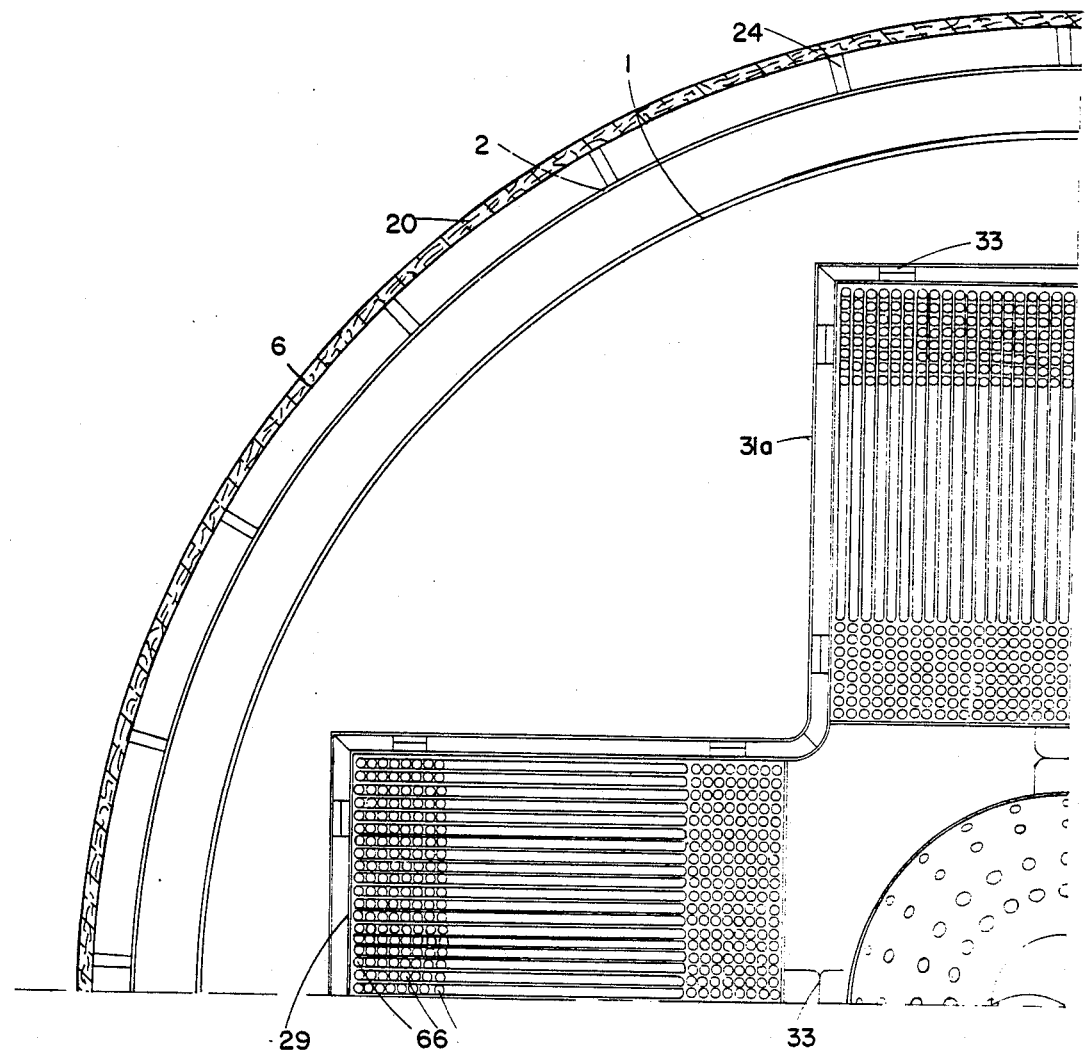
FIG. 8 is a sectional plan view taken across line VIII—VIII in FIG. 1.

FIG. 8 shows another quarter section, taken at line VIII—VIII of FIG. 1. This Figure is substantially similar to FIG. 7, however it is taken below the level of the distributor sheet (91, FIGS. 1, 7), therefore along the outside of the square shroud (29) is seen the diaphragm male portion (31a) and bumper blocks (33), which are also seen on the inside of the module between the square shroud (29) and the core module cylindrical support housing (35).

FIG. 9 is taken at line IX—IX in FIG. 1. This section is taken below the level of the serpentine coil (See FIG. 1), therefore within the boundary of the square shroud (29) is seen the base structure (30), through which cooled liquid metal coolant passes into the lower plenum (5) after flowing over the serpentine coils.

Preferred materials for the serpentine coil module assembly are 9 Cr - 1 Mo or 2¼ Cr - 1 Mo for the serpentine coils, the disengaging chamber and the associated structures which are welded to such assemblies. The material for the steam generator vessel is preferably 316 SS. The guard vessel is preferably 304 SS or 316 SS.

Temperature transients originating in the reactor vessel are mitigated in the steam generator module by means of the hot liquid metal coolant plenum (upper plenum (3)), in which the liquid metal coolant mixes prior to entering the inlet shrouds (90) around the outside of the square shrouds (29) enclosing the heat exchange modules (7). Temperature transients caused by malfunction of the steam generator are mitigated by the cold liquid metal coolant plenum (lower plenum (5)) of the module. The mitigating effect of the upper and lower plenums results in less severe thermal transients for the primary reactor circulation pump and for the liquid metal coolant returning to the reactor core.

Decay heat removal is accomplished by utilizing one or more of the feedwater steam connections to a serpentine coil module for this purpose. A separate reliable source of water may be provided to the feedwater inlet. The outlet from these coils is connected to a local natural draft cooling tower where steam is condensed and returned as cooled condensate to the coils. On scram, the steam generators may be removed from the operating feedwater/steam circuit and connected to a natually circulated water system, dedicated to core decay heat removal. Water enters the feedwater inlets of the steam generators and leaves the steam outlets as superheated steam. The steam flows to a natural draft cooling tower where it is condensed and cooled. The cooling tower height is sufficient to create the driving force required to cause the cooled water to circulate naturally through the coils within the steam generators by virtue of the density differential between the steam condensate and the cooled water.

An alternate or backup means of decay heat removal is provided by attachment of fins to the exterior of the guard vessel and utilizing air cooling for heat removal.

As an illustration, the outside surface of the guard vessel (7) is covered with vertical fins or vanes (24, FIG. 7) which are, for example, 8 inches deep and ¼ inch wide, and are welded to the surface of the guard vessel (2). A ¼ inch thick cylindrical insulation shroud (6) is attached to the outer boundary of the fins (24), to support a 3 inch thick layer of fiberglass thermal insulation (20). A steel clad fiberglass blanket (not shown) that insulates the bottom of the well in the concrete cavity in which the steam generator is mounted may also be provided. Outside ambient air is piped to the lower end of the shroud from an air shaft and flows upward by chimney effect through the passages formed by the fins and exhausts to a stack.

In the event that the main coolant circulating pump is not available, provision can been made for assuring a direct and low pressure drop pathway for natural circulation of the liquid metal coolant when the air cooling system is employed for decay heat removal. For this eventuality, the gas seals (51) separating the upper and lower plenums (3, 5) at the bottom area of the serpentine coil modules (7) are purged, thereby allowing a free flow of coolant from the hot plenum area (3), down through the cruciform opening and into the lower plenum (5) where it returns to the reactor via the jet eductor outlet (43, 45, 47). In the event an eductor is not utilized in the design, the flow would enter the pump suction through the perforations (39), pass through the pump and return to the reactor via the pump discharge line (41).

To illustrate operation of an embodiment utilizing sodium as coolant, with reference to FIG. 1, sodium at approximately 985° F. enters the steam generator vessel (1) via a sodium inlet line (48). The hot sodium mixes in the upper plenum (3) of the steam generator vessel (1) and flows into the orificed opening (91) of the inlet shrouds (90) associated with each serpentine coil module. The sodium enters the heat exchange area through openings (95) in the serpentine coil square shroud (29) and then passes over the serpentine coil bundles (59). Sodium flows downward over the coils (59), exchanging its heat across the double tube annular gap to the water/steam flowing within the inner tube (63) of the double tube assemblies (66). The flow path of the sodium is such that a low pressure drop occurs for the cooled sodium flow (less than 3 psi). The cooled sodium exits the bottom of the coil bundle (59) through base structure (30) at the bottom of the square shrouds (29) and mixes within the lower plenum (5) at the bottom of the steam generator vessel (1). A small portion of this sodium is entrained in the jet eductor (43) and returns to the reactor via the pump discharge pipe (47). The balance of the sodium flow enters the pump intake suction through perforations (39) at the bottom portion of the core module (8). Perforated openings (39) provide a uniform and well mixed sodium flow pattern within the lower plenum (5). The discharge pump raises the pressure of the liquid sodium and discharges it to the reactor via the eductor and discharge line.

To illustrate the water/steam circuit, with reference to FIG. 1, water enters the top of the steam generator vessel (1) at four separate nozzles (55). The water enters the inner tube (63) of the double tube assemblies (66)

and flows through the inner tubes (63) of the serpentine coils (59), picking up heat through the sodium in the annular gap (64) from the hot sodium coolant cascading downward over the coils. Sufficient heat transfer area is provided by the heat exchange modules (7) to boil the water and superheat the resulting steam within the coils. Superheated steam then exits from four steam nozzles (57) at the top of each heat exchange module (7).

Primary coolant flow past the steam generator coils can be terminated by closing a plate (not shown) which blocks the orifices (91) of the inlet shroud (90). Alternatively, a closure plate may be utilized for the opening (95) to the serpentine coil square shroud (29).

The serpentine coil module design has important advantages regarding possible breaks in either the inner tube or the outer tube of the double tube assembly. If the outer tube fails, the consequences are benign since the fluid in the annular gap of the duplex tube is chemically compatible with the primary coolant filling the steam generator vessel. In operation, the primary concern with the failure of an outer tube is having the ability to monitor outer tube ruptures in case of a corresponding rupture in the inner tube. Detection of an outer tube failure can be accomplished by sensors monitoring the sodium (or NaK) level in the annulus of each tube. If the unit is operated with the annulus level above the normal operating level of the primary coolant (25 in FIG. 1) then failure of the outer tube would cause the annulus level to either fall, if the disengaging chamber (77) is at the same or higher pressure than the cover gas in the vessel (1). Alternatively the disengaging chamber and annulus area above the liquid level in the annular gap can be maintained at a lower level than in the cover gas of the vessel. A leak in the outer tube would cause the level in the annular gap to rise. This can be detected by level or temperature sensors. In addition, pressure sensors in the disengaging chamber can be utilized. Pressure sensors would also immediately detect any leakage of water or steam within the disengaging chamber.

Failure of the inner tube is accommodated by having the outer tube of sufficient strength to withstand pressure pulses which could result from such a failure. In addition, the spacer within the annulus region serves to hold the inner tube and prevents it from separating at the failed point, thereby controlling the amount of water or steam released. Also, as discussed above the amount of sodium (or NaK) in the annular gap is small thereby limiting the sodium-water (NaK-water) reaction that would occur after a water tube break. The spiral pattern of the spacer rod within the annular gap provides a tortuous path through which escaping water/steam must flow. This further inhibits the effects of the sodium/water (NaK-water) reaction and, together with the limited amount of sodium (NaK) available, resulting in a slow reaction which can be easily accommodated by the disengaging chambers. Finally, a rupture disc in the disengaging chamber will serve to limit the peak pressure within this chamber.

In the event of a rupture of one of the inner tubes the escaping steam and feedwater, and the hydrogen and sodium hydroxide from the resulting reaction with the small amount of sodium in the annular gap, all flow to the disengaging chamber at either end of the double tube assembly in which the rupture occurred.

Each disengaging chamber preferably has connections to a rupture disc which exhausts to a steam and hydrogen disposal system, and separate connections (not shown) for a sodium (or NaK) disposal system. Each pipe to the steam and hydrogen disposal system is sealed with a rupture disc, e.g., 45 psia. Each pipe to the sodium disposal and fill system has a closure valve which is closed while the steam generator is operating. As pressure within a disengaging chamber rises to the tolerance set point of the rupture disc, the blowout of the rupture disc allows the escaping steam and hydrogen to vent to a disposal system. Only a low pressure buildup occurs: Since the quantity of sodium in the annular gap is small, only a small fraction of this sodium initially is exposed to the water/steam released from the breach in the inner tube and the rupture disc limits the peak pressure in the disengaging chamber.

An important feature of this invention is that through utilization of a multiplicity of duplex tube assemblies, the flash discharge from a water tube rupture is very small compared with prior art systems, and shut-down procedures in the event of such a rupture may be instituted before an emergency situation develops. The duplex tube construction is such that the spacer within the annulus of the duplex tube inhibits gross movement of an inner tube in the event of an inner tube break. Thus, the flow area for water or steam to emerge from the break is small and the resulting pressure transient within the annulus is significantly reduced. The small volume of sodium in the annular gap is beneficial from a sodium-water reaction standpoint because even if water/steam flow to the failed inner tube is not stopped, the small amount of sodium in the annular gap will limit the water-sodium reaction to a level that can be readily accommodated by the serpentine coil module. Because the sodium/water reaction is slowed and controlled by the design of the heat exchange module, fast-acting (i.e., less than 5 seconds closure time) valves to isolate a failed tube are not required. Closure of the valves in steam and feedwater pipes associated with the module containing the failed tube terminates the source of water/steam flowing through a failed inner tube. Consequently, immediate closure of all water/steam flow paths to and from the unaffected heat exchange modules is not required for a single water tube rupture, and the steam generator/reactor system may continue limited operation or may be shut down without experiencing a severe temperature transient.

After the feedwater line and the steam line leading to the double tube assembly in which a rupture occurs are valved off and the pressure within the disengaging chamber has been reduced to atmospheric, any sodium remaining in the disengaging chamber is drained to a sodium disposal system. All sodium piping is heat traced. This is accomplished either in situ by connecting a drainage system to the module and flushing the disengaging chamber and annular gaps of the double tube assemblies or by removing the serpentine coil module from the vessel and cleaning the disengaging chamber at a maintenance area.

For operations in which the module is not removed, after the disengaging chamber has been drained, the blowout rupture discs are replaced and all sodium remaining in the annular gap of the double tube assemblies is sent to the sodium disposal unit by pressuring one side of the disengaging chamber with hot argon gas. Following this, the failed tube is plugged and the tube cluster is flushed with hot sodium to the sodium disposal unit to remove the remaining sodium hydroxide resulting from the sodium-water reaction.

The annular gap is then refilled with hot sodium (or NaK) to the operating level and the module is returned to service.

Alternatively, the module may be removed from the steam generator vessel and replaced with a spare module, or the shroud opening for the removed module may be sealed and operation continued until a replacement module is available.

The double tube serpentine coil steam generator of this invention may also be directly used in the pool or integrated type of liquid metal cooled reactor. This type of reactor features a multiplicity of low pressure drop (less than 3 psi) heat exchangers, which are immersed a pool of liquid metal coolant within the reactor vessel. This application of the serpentine coil design is effective because the compact serpentine coil assembly may be readily integrated into conventional pool-type reactor vessels, and the unit has approximately the same pressure drop as an intermediate heat exchanger. Such an embodiment is diagrammed in FIG. 10.

For this application, the serpentine coil steam generator assembly is not enclosed in a steam generator vessel and guard vessel, as in the modular steam generator illustrated in FIG. 1. Rather, the apparatus is enclosed by the main reactor vessel (101). A circulating pump (not shown) is located at a separate area of the reactor vessel. In this type of embodiment, a multiplicity of serpentine coil modules (7) are provided. The serpentine coil modules (7) may be square in the plan view, rectangular or another shape. The central support for the coil modules (7) is provided by a grid (11). The serpentine coil module, complete with coils, coil supports, disengaging chamber, feedwater nozzles, and steam nozzles is supported from the grid structure in the same manner as in FIG. 1. For this application a greater number of tubes (and thus larger modules) may be employed in order to limit the total number of modules within the single vessel. The supporting grid structure is composed, for example, of 3 inch thick vertical plates approximately 90 inches high welded to both sides of a 10 inch wide×6 inch thick horizontal plate. The shrouds for the serpentine module extend from the bottom of the 3 inch thick vertical plate.

Figure 10:
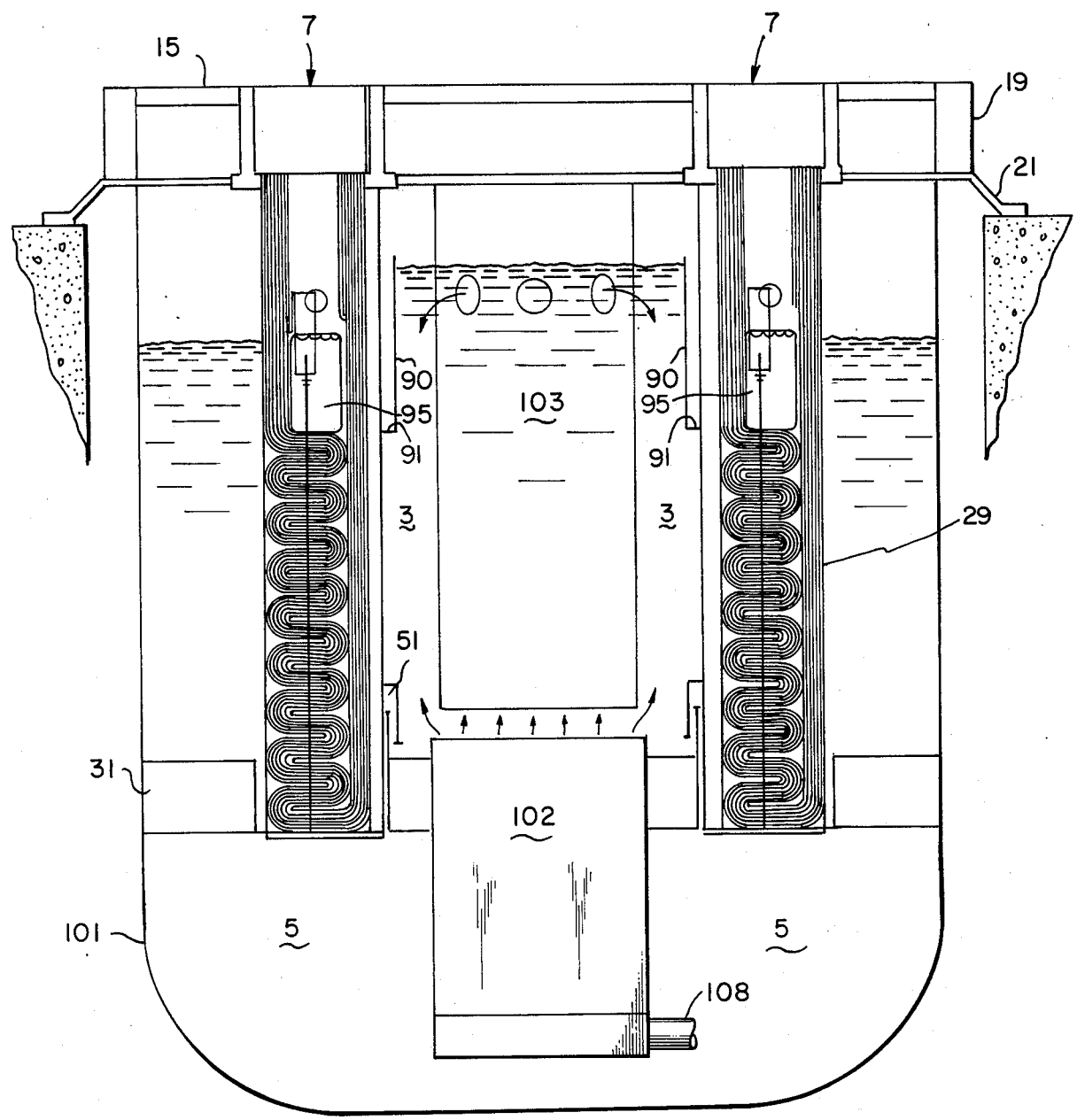
FIG. 10 is a longitudinal cross-sectional elevational view of an alternate embodiment of the steam generator of this invention.

Referring to FIG. 10, a single pool type vessel (101) contains a reactor core (102), serpentine coil modules (7), a pump module of which the circulating discharge line (108) is shown, structure for housing control rods and core monitoring equipment (103), a ring girder (19) and skirt (21), a closure plate (15), a diaphragm (31), and gas seals (51) separating the vessel into a hot and cold plenum. Refueling equipment and the guard vessel are not shown. The grid structure is arranged such that box-like compartments are formed for insertion of the serpentine coil modules (7).

Flow exiting the control rod drive housing structure (103) and flow exiting the core area is mixed in the upper plenum area (3) before entering the inlet shrouds (90) of each module. Sodium then enters the coil bundle area through shroud opening (95) and flows by gravity past the duplex tubes. Flow exiting the serpentine coil bundle then mixes in the cold plenum area (5). Flow then enters the pump module and is discharged to the inlet of the core via the pump discharge line (108). FIG. 10 illustrates a gas seal (51) only on one side of of the modules. Free flow of hot sodium may be allowed past the module shrouds so that flow enters the modules from both the upper plenum region (3) and the region adjacent to the vessel walls. In this case the gas seal would be extended to ensure that hot sodium does not bypass the serpentine coil modules in the diaphragm area.

The inlet flow shroud (90) may be separately provided for each serpentine coil module shroud (29) or may be an integral unit for all serpentine coil module shrouds. For the integral unit design, flow past the orifices (91) would collect in an annular header which is common to all inlet openings for the serpentine coil shrouds. For separately provided inlet shrouds, flow past the orifices would collect in an annulus that feeds the sodium to only one shroud opening.

To stop circulation to a specific serpentine coil assembly of the separate inlet shroud design, either a plate would be placed over the orifice openings or a closure plate would be inserted in the area of the shroud inlet opening. For the integral inlet flow shroud design, a closure plate for the shroud opening would be used. Such a closure would be needed in the event a serpentine coil module was removed from the vessel. In such a case once the module was removed, a cover plate would be placed over the shroud opening. Such a plate may be inserted at the time of maintenance operations or may be located within the shroud and unlatched for closure of the opening once the serpentine coil module has been removed.

The operation of the double tube serpentine coil steam generator in the pool reactor is similar to that described above for the modular steam generator vessel system. Liquid metal coolant exiting the reactor core (102) enters under the inlet shroud (90) region for each module. Sodium then flows into the opening of the serpentine coil shroud, and is distributed evenly over the serpentine coils. The liquid metal coolant then flows by gravity downward past the serpentine coils into the bottom pump plenum (5). The pump (not shown) circulates the liquid metal coolant through the reactor core (102) via pump discharge line (41) to complete the coolant flow circuit.

All of the patents mentioned above are incorporated herein by reference. From the foregoing diclosure, variations and modifications will be readily apparent to persons skilled in this art. However, all such obvious variations are intended to be within the scope of the invention as defined by the appended claims.

What is claimed is:

1. A heat exchanger for transferring heat from a primary fluid to a secondary fluid through an intermediate heat transfer fluid comprising a closed intermediate heat transfer fluid circuit comprising a disengaging chamber and a tubular coil portion connected at each end to said disengaging chamber, which coil portion is immersed in the primary fluid and wherein said intermediate heat transfer fluid circuit is partially filled with a non-circulating intermediate heat transfer fluid which is compatible with said primary fluid, and a secondary fluid circuit which passes through the disengaging chamber and through the tubular coil portion, and is substantially completely enclosed by said intermediate heat transfer fluid circuit, wherein the intermediate heat transfer fluid resides in the space enclosed within the tubular coil portion but outside said secondary fluid circuit and surrounds said secondary fluid circuit.

2. A heat exchanger as defined in claim 1, wherein said intermediate heat transfer fluid circuit includes a multiplicity of coil portions.

3. A heat exchanger as defined in claim 2, wherein said intermediate heat transfer fluid circuit has a removeable modular configuration.

4. A heat exchanger as defined in claim 3, wherein said disengaging chamber includes means for detecting a rupture in said intermediate heat transfer fluid circuit or said secondary fluid circuit.

5. A heat exchanger as defined in claim 3, wherein said coil portions are comprised of concentric double tube assemblies, wherein the secondary fluid circuit comprises the inner tube and the intermediate heat transfer fluid circuit comprises the outer tube exclusive of the inner tube.

6. A heat exchanger as defined in claim 4 which further includes a circulation pump located centrally in a separate core module, which pump circulates cooled primary fluid back to a heat source.

7. A steam generator comprising a container having a closed lower end, divided into longitudinally arranged sections including an upper plenum and a lower plenum, said upper plenum being above said lower plenum and accomodating at least one removeable heat exchange module, wherein
   each heat exchange module is comprised of at least one disengaging chamber, a multiplicity of double tube assemblies, at least one feedwater inlet and at least one steam outlet;
   each of said double tube assemblies is comprised of an inner tube individually enclosed for at least a portion of its length by an outer tube to form a double tube portion and thereby define an annular gap which is outside said inner tube but enclosed by said outer tube;
   each inner tube is attached at one end to a feedwater inlet, and each inner tube is attached at the other end to a steam outlet;
   said outer tube being in open communication at both ends with said disengaging chamber;
   said double tube portion being in the configuration of a coil for part of its length;
   said upper plenum has no communication with said disengaging chamber and has restricted communication with said lower plenum such that liquid metal entering the upper plenum and flowing to said lower plenum closely contacts at least a portion of the double tube assemblies; and
   said annular gap is at least partially filled with liquid metal.

8. A steam generator as defined in claim 7, wherein each heat exchange module is suspended from a support grid connected to said container near its upper end.

9. A steam generator as defined in claim 8, wherein said support grid forms a plurality of cavities providing seats from which a corresponding plurality of heat exchange modules may be supported.

10. A steam generator as defined in claim 9, wherein said support grid forms five square cavities of equal size in a cruciform configuration.

11. A steam generator as defined in claim 10, which further includes a core module supported in the central cavity formed by said support grid and wherein four heat exchange modules are supported in the outer four cavities.

12. A steam generator as defined in claim 11, wherein said core module contains a pump with intake means in communication with said lower plenum.

13. A modular steam generator comprising a cylindrical vessel having a closed lower end, divided into at least two longitudinally arranged sections including an upper plenum and a lower plenum, said upper plenum being above said lower plenum and containing support means for at least one removeable heat exchange module, wherein
   each heat exchange module is comprised at least one disengaging chamber, a multiplicity of double tube assemblies and a plurality of feedwater inlet nozzles and steam outlet nozzles, the number of feedwater inlet nozzles being equal to the number of steam outlet nozzles, and each of said nozzles providing communication to the outside of the cylindrical vessel;
   each of said double tube assemblies is comprised of an inner tube individually enclosed for at least a portion of its length by an outer tube to form a double tube portion and thereby define an annular gap which is outside said inner tube but enclosed by said outer tube;
   said inner tubes are attached at one end to a feedwater inlet and attached at the other end to a steam outlet nozzle;
   said outer tubes are in open communication at both ends with a disengaging chamber;
   said annular gap is at least partially filled with liquid metal;
   each double tube portion extends from its end closest to the feedwater inlet connection of its inner tube downwardly to the bottom of said upper plenum, then curves upwardly in a coil configuration for at least a portion of the length of said upper plenum, the remainder of said double tube portion extending upwardly to its end closest to the connection of its inner tube with a steam outlet nozzle;
   said upper plenum has at least one liquid metal inlet in open communication with the outside of the cylindrical vessel, said upper plenum having no communication with said disengaging chamber and having restricted communication with said lower plenum such that liquid metal entering the upper plenum and flowing downwardly to said lower plenum closely contacts at least a portion of the double tube helical coil;
   said lower plenum having at least one liquid metal outlet in open communication with the outside of the cylindrical vessel;
   said double tube assemblies are enclosed by a shroud extending the length of the upper plenum, the portion of said upper plenum outside said shroud being separated from said lower plenum by a diaphragm;
   the portion of said upper plenum outside said shroud is in communication with the portion enclosed by said shroud by means of a plurality of liquid metal distributor openings in said shroud.

14. A steam generator as defined in claim 13, wherein said coil configuration is a serpentine coil configuration.

15. A steam generator as defined in claim 14, wherein each heat exchange module includes 10–1000 double tube assemblies and each nozzle is connected to 10–200 inner tubes.

16. A steam generator as defined in claim 14, wherein the support means comprises a grid of straight members connected to the cylindrical vessel near its upper end, said grid forming a cruciform pattern of five equally sized square cavities for receiving heat exchange and equipment modules.

17. A steam generator as defined in claim 16, wherein the cylindrical vessel is substantially completely enclosed in a guard vessel.

18. A steam generator as defined in claim 16, wherein said inner tubes have an outside diameter of about 1.25 inches and said outer tubes have an inside diameter of about 1.615 inches and an outside diameter of about 1.75 inches.

19. A steam generator as defined in claim 16, wherein a spacer is provided between said inner and outer tubes.

20. A steam generator as defined in claim 16, wherein said liquid metal in said annular gap is sodium or a sodium-potassium mixture.

21. A steam generator as defined in claim 16, further including a jet eductor located in said lower plenum having intake means positioned to receive both liquid metal flowing from the upper plenum and liquid metal being discharged by a discharge pump, housed in a core module located in the central cavity of said support grid, said pump having intake means in communication with said lower plenum and directing its discharge through said liquid metal outlet.

22. A steam generator as defined in claim 16, wherein the double tube assemblies are fabricated from a low alloy steel selected from 2¼Cr - 1 Mo or 9 Cr - 1 Mo, and the cylindrical vessel is fabricated from high alloy steel selected from 304 SS or 316 SS, and the structural connections wherein low alloy steel and high alloy steal are joined are accomplished without a bimetallic weld.

23. A steam generator as defined in claim 16, wherein detection means are in communication with said disengaging chamber which are capable of detecting failure of an individual inner tube within a double tube assembly or failure of an individual outer tube.

24. A steam generator as defined in claim 23, wherein said detection means for failure of an inner tube include a hydrogen detector probe in the disengaging chamber and wherein said detection means for failure of an outer tube include a liquid level or temperature probe monitoring the height or temperature of liquid metal in the double tube portion of said helical coils.

25. A steam generator as defined in claim 23, further including blow-out seals in communication with the volume of the disengaging chamber which will rupture at the increase in pressure within the disengaging chamber caused by the reaction in one double tube portion between the liquid metal in the annular gap and water leaking from a failed inner tube in said double tube portion or caused by leakage from a water or steam tube within the disengaging chamber.

26. A steam generator as defined in claim 23, wherein said disengaging chamber is in communication with a purge line and a drain line, each equipped with a valve closure, said drain line providing communication between the disengaging chamber and disposal means for solid or liquid material entering the disengaging chamber.

27. A steam generator as defined in claim 23, which further includes one or more gas seals between the diaphragm and the shroud such that when the seals are breached, liquid metal entering the upper plenum may flow directly to the lower plenum, and wherein said gas seals and said liquid metal distributor openings provide the only means of communication between the upper plenum and the lower plenum.

28. A steam generator as defined in claim 27, wherein said cylindrical vessel is substantially completely enclosed in a guard vessel, which guard vessel is equipped with vertical fins attached to the outer surface of the guard vessel and extending for at least a major portion of the length of the guard vessel, said fins providing a heat transfer surface providing heat removal from the guard vessel and being capable of directing air flow vertically along the surface of said guard vessel and its fins.

29. A steam generator as defined in claim 28, wherein a layer of insulating material surrounds the guard vessel, supported at the ends of said vertical fins.

30. A steam generator as defined in claim 28, wherein said disengaging chamber is subdivided into discrete sections, each section corresponding to an inlet or outlet nozzle and enclosing a separate bundle of tubes, such that the double tube portion annular gaps of each tube bundle are in communication with only one disengaging chamber section at either end of the double tube portion, and such that isolation of an individual double tube bundle by closing off its inlet and outlet nozzles, or isolation of any individual inner tube by sealing its inlet and outlet opening, does not influence the operation of the rest of the steam generator.

31. A steam generator as defined in claim 30, wherein vent and drain holes interconnect each inlet disengaging chamber and separate vent and drain holes interconnect each outlet disengaging chamber, and a rupture disc and a fill/drain line connect to each disengaging chamber.

32. A nuclear power plant comprising a nuclear reactor having a circulating liquid metal cooling system, which cooling system is connected to the steam generator as defined in claim 29.

33. A pool reactor comprising
a vessel,
a nuclear core which is cooled by a primary fluid,
at least one heat exchanger for transferring heat from said primary fluid to a secondary fluid through an intermediate heat transfer fluid, said heat exchanger comprising
a closed intermediate heat transfer fluid circuit comprising a disengaging chamber and a serpentine coil portion connected at each end to said disengaging chamber, which serpentine coil portion is immersed in the primary fluid and wherein said intermediate heat transfer fluid circuit is partially filled with a stagnant intermediate heat transfer fluid which is compatible with said primary fluid, and
a secondary fluid circuit which passes through the vessel and is substantially completely enclosed by said intermediate heat transfer fluid circuit.

34. A pool reactor as defined in claim 33, having a circulation pump immersed in the primary fluid which returns primary fluid discharged from the heat exchanger to the nuclear core.

35. A method for removing decay heat in a nuclear power plant comprising a nuclear reactor having a circulating liquid metal cooling system, which cooling system includes at least one steam generator comprising
a steam generator vessel having a closed lower end, divided into at least two longitudinally arranged sections including an upper plenum and a lower plenum, said upper plenum being above said lower plenum and containing a plurality of heat exchange modules, wherein
each heat exchange module is comprised of at least one disengaging chamber, a multiplicity of double tube assemblies, at least one feedwater inlet and at least one steam outlet;

each of said double tube assemblies is comprised of an inner tube individually enclosed for at least a portion of its length by an outer tube to form a double tube portion and thereby define an annular gap which is outside said inner tube but enclosed by said outer tube;

each inner tube is attached at one end to a feedwater inlet, and each inner tube is attached at the other end to a steam outlet;

said outer tube being in open communication at both ends with said disengaging chamber;

said double tube portion being in the configuration of a coil for part of its length;

said upper plenum has no communication with said disengaging chamber and has restricted communication with said lower plenum such that liquid metal entering the upper plenum and flowing to said lower plenum closely contacts at least a portion of the double tube assemblies;

said annular gap is at least partially filled with stagnant liquid metal; and a guard vessel substantially completely enclosing said steam generator vessel, which guard vessel is equipped with vertical fins attached to the outer surface of the guard vessel and extending for at least a major portion of the length of the guard vessel, said fins providing a heat transfer surface for heat removal from the guard vessel and being capable of directing air flow vertically along the surface of said guard vessel and its fins; said method comprising:

(1) circulating water to the steam generator and condensing the steam in a condenser, or
(2) connecting one or more inner tubes to a cooling tower whereby the steam generated in the inner tubes is condensed in the cooling tower and recycled to the inner tubes, or
(3) circulating air under the guard vessel such that cooling air is channeled along the sides of the guard vessel by the vertical fins, or
(4) any combination of (1), (2) or (3), above.

* * * * *